(12) United States Patent
Vinalon

(10) Patent No.: US 12,022,043 B2
(45) Date of Patent: Jun. 25, 2024

(54) IMAGE PROCESSING DEVICE AND IMAGE FORMING APPARATUS CAPABLE OF DETECTING AND CORRECTING MIS-CONVERTED CHARACTER IN TEXT EXTRACTED FROM DOCUMENT IMAGE

(71) Applicant: KYOCERA Document Solutions Inc., Osaka (JP)

(72) Inventor: Jezza Vinalon, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 379 days.

(21) Appl. No.: 17/510,175

(22) Filed: Oct. 25, 2021

(65) Prior Publication Data
US 2022/0141349 A1    May 5, 2022

(30) Foreign Application Priority Data
Nov. 4, 2020   (JP) .................................. 2020-184534

(51) Int. Cl.
*G06V 30/12*    (2022.01)
*G06F 18/22*    (2023.01)
(Continued)

(52) U.S. Cl.
CPC ............. *H04N 1/387* (2013.01); *G06F 18/22* (2023.01); *G06F 40/166* (2020.01);
(Continued)

(58) Field of Classification Search
CPC ........ H04N 1/387; G06F 18/22; G06F 40/166; G06F 40/279; G06F 40/232;
(Continued)

(56) References Cited

U.S. PATENT DOCUMENTS

| | | | |
|---|---|---|---|
| 9,772,989 B2 * | 9/2017 | Otaki | .................... G06F 40/186 |
| 2013/0108160 A1 * | 5/2013 | Yamazoe | ............. G06V 30/268 |
| | | | 382/177 |

(Continued)

FOREIGN PATENT DOCUMENTS

JP    2019-106028 A    6/2019

*Primary Examiner* — Wesley J Tucker
*Assistant Examiner* — Han Hoang
(74) *Attorney, Agent, or Firm* — IP Business Solutions, LLC

(57) ABSTRACT

An image processing device includes a storage device that previously stores a document image, a plurality of registered words, and a plurality of font characters, and a control device that functions as: a character region identifier that identifies a character region in the document image; an image acquirer that acquires an image of the character region; a text extractor that extracts a text from the image of the character region; a word identifier that identifies each of words in the text; a word determiner that determines whether each of the words is matched with one of the registered words; and a generator that generates a corrected text by replacing a target character of a non-matching word in the text with, among the font characters, a font character having a first degree of matching not lower than a first rate with the target character and a highest first degree of matching.

4 Claims, 18 Drawing Sheets

(51) Int. Cl.
  *G06F 40/166*    (2020.01)
  *G06F 40/279*    (2020.01)
  *G06V 10/26*     (2022.01)
  *G06V 30/244*    (2022.01)
  *G06V 30/262*    (2022.01)
  *G06V 30/414*    (2022.01)
  *H04N 1/387*     (2006.01)

(52) U.S. Cl.
  CPC ............ *G06F 40/279* (2020.01); *G06V 10/26* (2022.01); *G06V 30/12* (2022.01); *G06V 30/245* (2022.01); *G06V 30/268* (2022.01); *G06V 30/414* (2022.01)

(58) Field of Classification Search
  CPC .... G06F 40/205; G06F 40/284; G06F 40/242; G06V 10/26; G06V 30/12; G06V 30/245; G06V 30/268; G06V 30/414
  See application file for complete search history.

(56) References Cited

U.S. PATENT DOCUMENTS

| | | | |
|---|---|---|---|
| 2019/0180096 A1 | 6/2019 | Tsuji | |
| 2021/0064860 A1* | 3/2021 | Tuma | G06F 16/93 |
| 2022/0030138 A1* | 1/2022 | Inoue | H04N 1/626 |
| 2023/0065965 A1* | 3/2023 | Liu | G06F 40/40 |

* cited by examiner

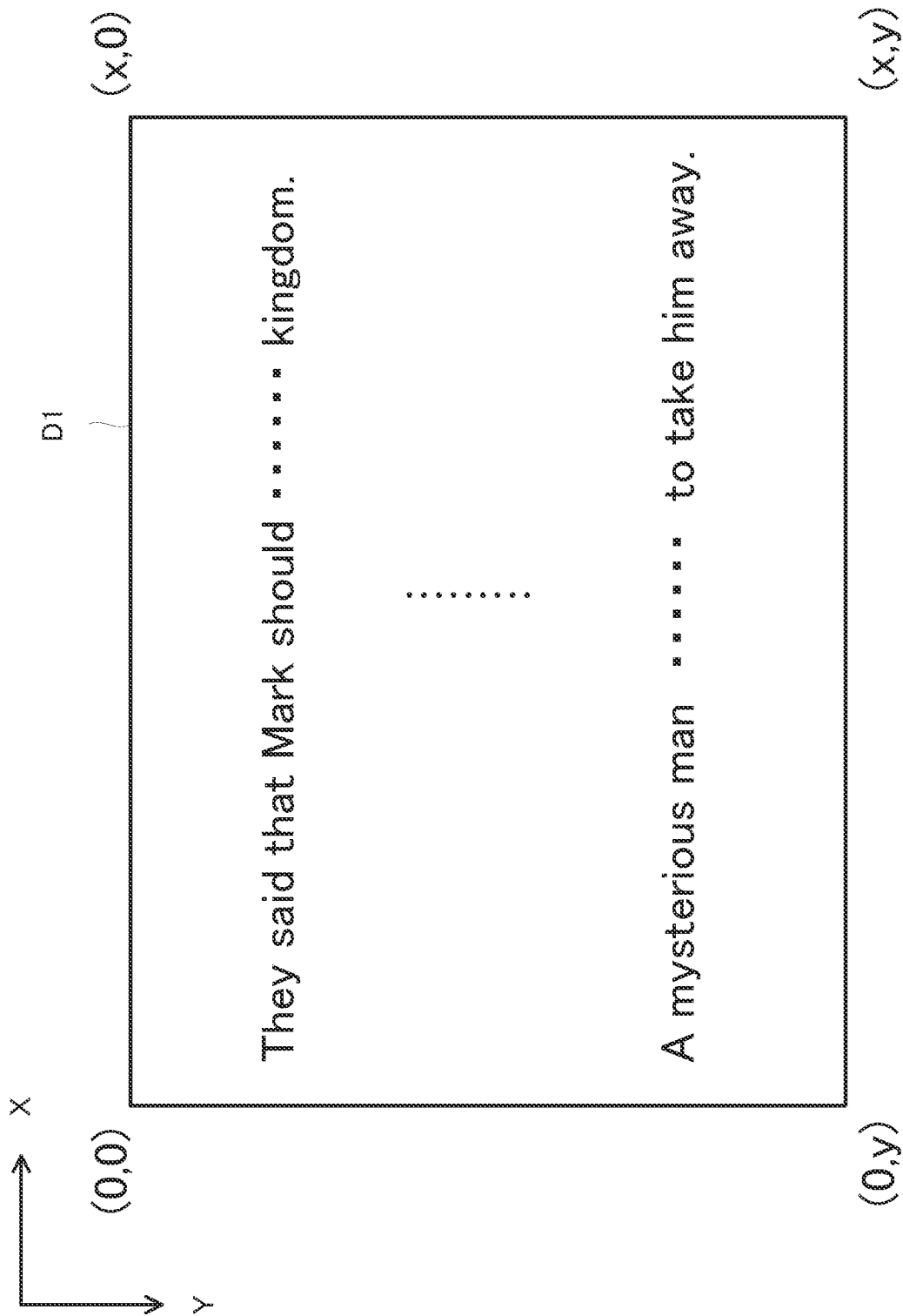

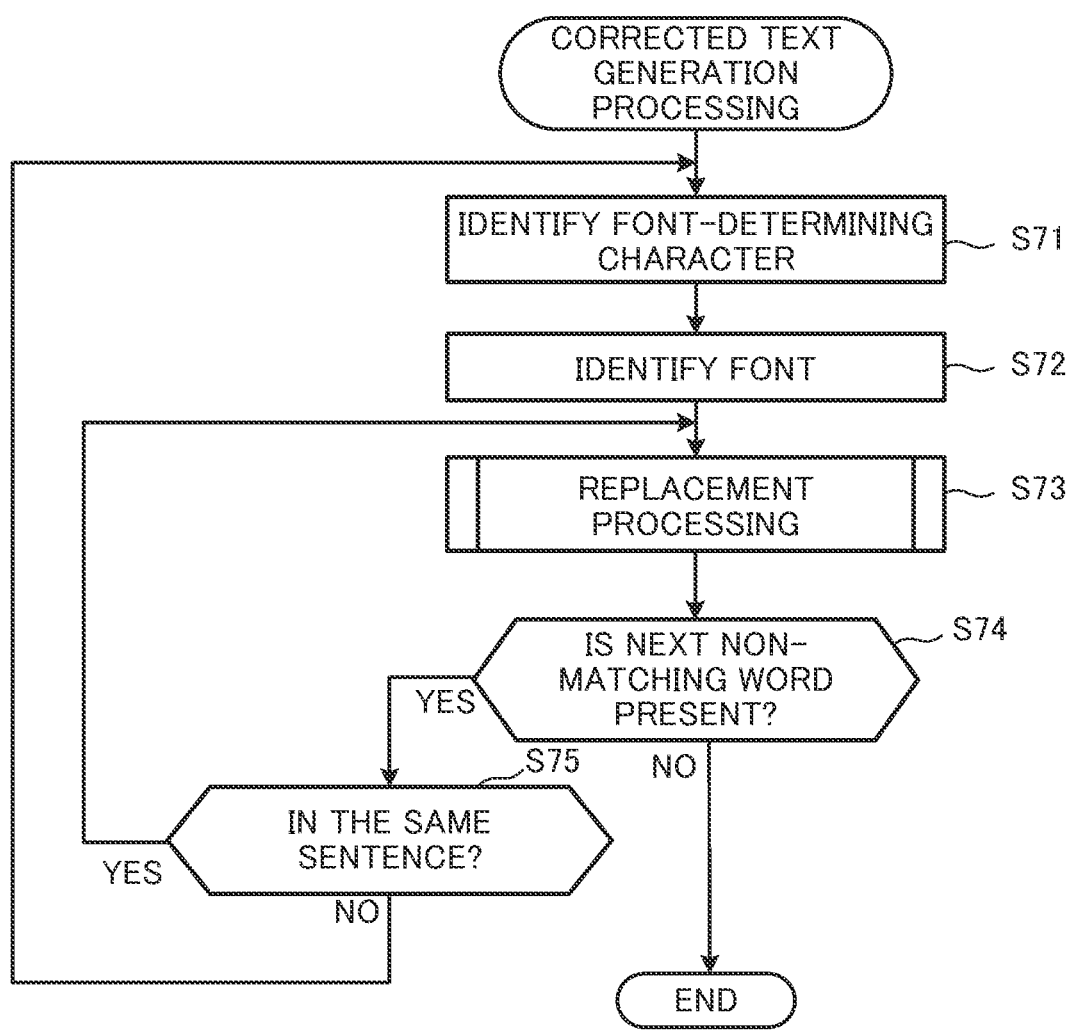

Fig. 10
FONT-DETERMINING CHARACTER
(22 × 22 GRID)
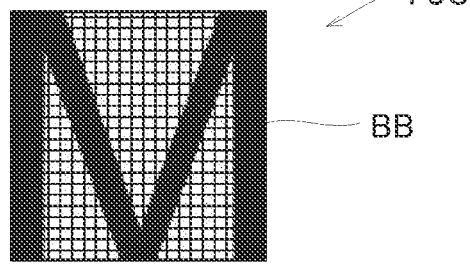
151 PIXELS
CHARACTER "M"
IN "ARIAL" FONT
(22 × 22 GRID)
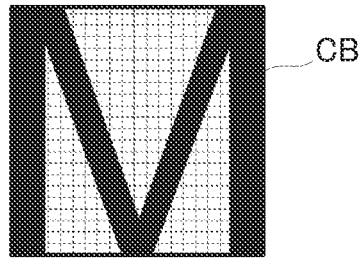
160 PIXELS
SECOND DEGREE OF
MATCHING=94.38%
IDENTIFY "ARIAL" HAVING HIGHEST
SECOND DEGREE OF MATCHING
AS MOST SIMILAR FONT
CHARACTER "M"
IN "COURIER NEW" FONT
(22 × 22 GRID)
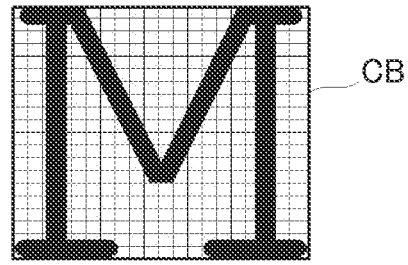
122 PIXELS
SECOND DEGREE OF
MATCHING=80.79%

Fig.14
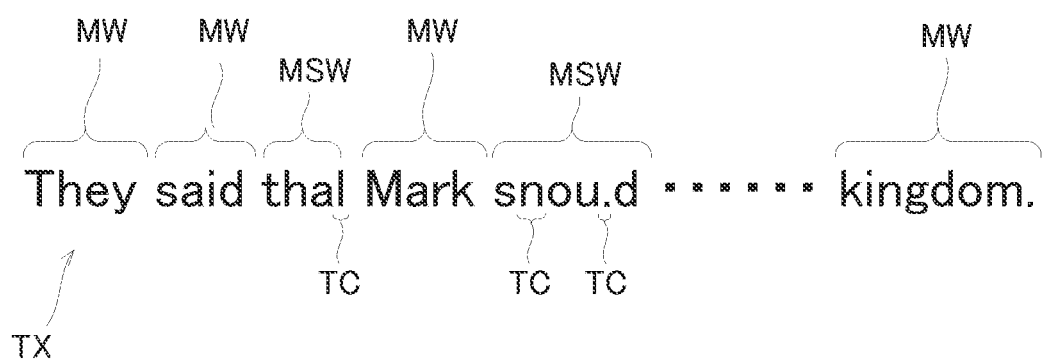
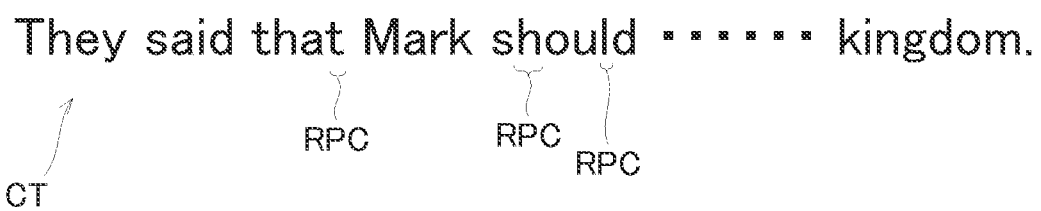

IMAGE PROCESSING DEVICE AND IMAGE FORMING APPARATUS CAPABLE OF DETECTING AND CORRECTING MIS-CONVERTED CHARACTER IN TEXT EXTRACTED FROM DOCUMENT IMAGE

INCORPORATION BY REFERENCE

This application claims priority to Japanese Patent Application No. 2020-184534 filed on 4 Nov. 2020, the entire contents of which are incorporated by reference herein.

BACKGROUND

The present disclosure relates to image processing devices and image forming apparatuses and particularly relates to a technique for detecting and correcting a mis-converted character in a text acquired by OCR (optical character recognition) processing.

Generally, an image forming apparatus is known in which an image reading device reads a plurality of original documents (such as name cards) on an original glass plate in a single round of scanning and a document image acquired by the image reading device is subjected to known OCR processing, thus acquiring text data. For example, if some of the plurality of original documents placed on the original glass plate are overlapped with each other or if any one of the original documents sticks out of a scanning area of the original glass plate, the document image will be partially missing. In such a case, text data acquired by OCR processing of the document image will also be inevitably partially missing. The above general image forming apparatus compensates for the missing part of text data by replacing the partially missing text data with a text data candidate for compensation analogized from text data on another original document.

SUMMARY

A technique improved over the aforementioned technique is proposed as one aspect of the present disclosure.

An image processing device according to an aspect of the present disclosure includes a storage device and a control device. The storage device previously stores a document image of an original document, a plurality of predetermined registered words, and a plurality of font characters representing respective predetermined characters presented in a predetermined font. The control device includes a processor and functions, through the processor executing a control program, as a character region identifier, an image acquirer, a text extractor, a word identifier, a word determiner, and a generator. The character region identifier identifies a character region in the document image. The image acquirer acquires an image of the character region from the document image. The text extractor extracts a text from the image of the character region. The word identifier identifies each of a plurality of words contained in the text. The word determiner determines whether or not each of the plurality of words is matched with any one of the plurality of registered words. When the text contains a non-matching word having been determined not to be matched with any of the registered words by the word determiner, the generator generates a corrected text by replacing a target character being a constituent of the non-matching word in the text with, among the plurality of font characters, a font character having a first degree of matching equal to or higher than a predetermined first rate with the target character and a highest first degree of matching with the target character.

An image forming apparatus according to another aspect of the present disclosure includes the above-described image processing device, an image reading device, and an image forming device. The image reading device reads an original document to generate the document image of the original document. The image forming device forms on a recording medium an image representing the corrected text. The control device further functions as a controller that allows the storage device to store the document image generated by the image reading device.

BRIEF DESCRIPTION OF THE DRAWINGS

FIG. 6A is a view showing an example of a document image.

FIG. 8 is a flowchart showing an example of corrected text generation processing.

FIG. 10 is a view showing an example of the font identification processing.

FIG. 14 is a view showing an example of a method for generating a corrected text.

DETAILED DESCRIPTION

Figure 1:
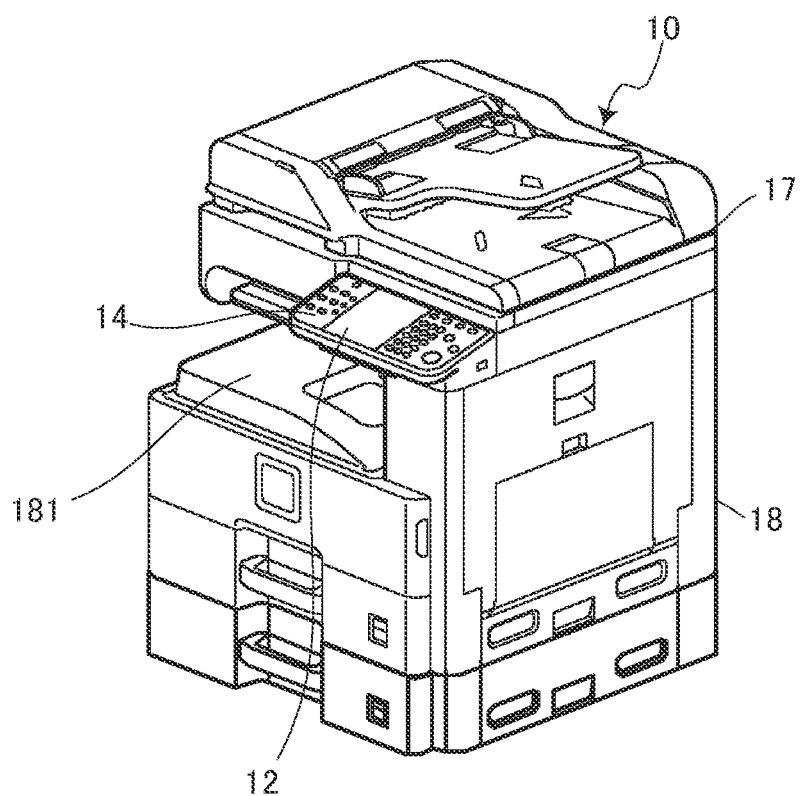
FIG. 1 is a perspective view of an image forming apparatus according to one embodiment of the present disclosure.
Figure 2:
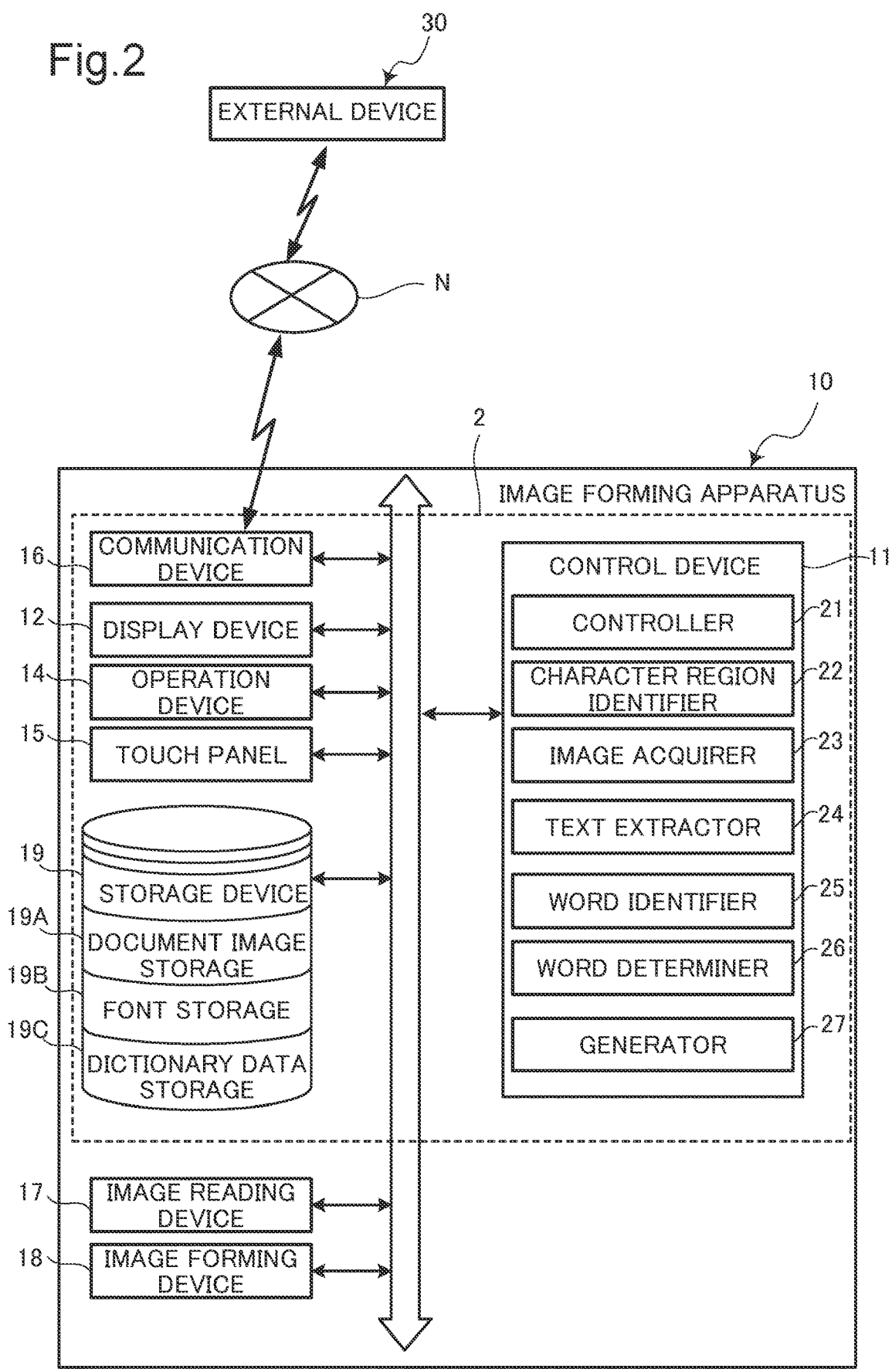
FIG. 2 is a block diagram showing the configuration of the image forming apparatus.

Hereinafter, a description will be given of an image processing device and an image forming apparatus according to an embodiment of the present disclosure with reference to the drawings. FIG. 1 is a perspective view of an image forming apparatus 10 according to an embodiment of the present disclosure. FIG. 2 is a block diagram showing the configuration of the image forming apparatus 10.

The image forming apparatus 10 includes a control device 11, a display device 12, an operation device 14, a touch panel 15, a communication device 16, an image reading device 17, an image forming device 18, and a storage device 19. These components are capable of data or signal transfer via a bus among them.

The image reading device 17 is, for example, a reader including a CCD (charge coupled device) serving as a scanner that optically reads an original document G1 (see FIG. 3) being conveyed by an auto document feeder or an original document G1 placed on a flatbed. The image reading device 17 generates a document image D1 (see FIG. 3) representing the original document G1. The document image D1 has a rectangular outline because of the structure of the above reader.

The image forming device 18 uniformly charges the surface of a photosensitive drum, exposes the surface of the photosensitive drum to light to form an electrostatic latent image on the surface of the photosensitive drum, develops the electrostatic latent image on the surface of the photosensitive drum into a toner image, transfers the toner image (an image) on the surface of the photosensitive drum to a recording paper sheet, and fixes the toner image on the recording paper sheet. For example, the image forming device 18 prints on the recording paper sheet the document image D1 obtained by reading of the original document G1 by the image reading device 17. The recording paper sheet with the document image D1 printed thereon is discharged to a sheet output tray 181.

The rest of the image forming apparatus 10 except for the image reading device 17 and the image forming device 18 constitutes an image processing device 2.

The display device 12 is a display device, for example, such as a liquid crystal display (LCD) or an organic EL (organic light-emitting diode (OLED)) display.

The operation device 14 accepts entry of instructions on various operations from a user. The operation device 14 includes various hard keys, such as a menu key for calling up a menu, arrow keys for moving the focus of a GUI (graphical user interface) forming the menu, an accept key for performing a determination operation for the GUI forming the menu, and a start key.

The touch panel 15 is a touch panel of, for example, a resistive film system or a capacitance system. The touch panel 15 is disposed on the screen of the display device 12. The touch panel 15 detects a touch of the screen of the display device 12 with a finger or the like, together with the point of touch. When detecting the touch with a finger or the like, the touch panel 15 outputs a detection signal indicating the coordinates of the point of touch to a controller 21 of the control device 11 and so on. Therefore, the touch panel 15 serves as an operation device through which a user's operation made on the screen of the display device 12 is input.

The communication device 16 is a communication interface including a communication module. The communication device 16 sends and receives data to and from an external device 30 (for example, a personal computer, a server or a mobile information terminal) via a network N, such as a LAN (local area network), a public line or the like.

The storage device 19 is a large storage device, such as an HDD (hard disk drive). The storage device 19 includes a document image storage 19A that stores the document image D1 (i.e., image data) of the original document G1 obtained by reading of the original document G1 by the image reading device 17.

Figure 3:
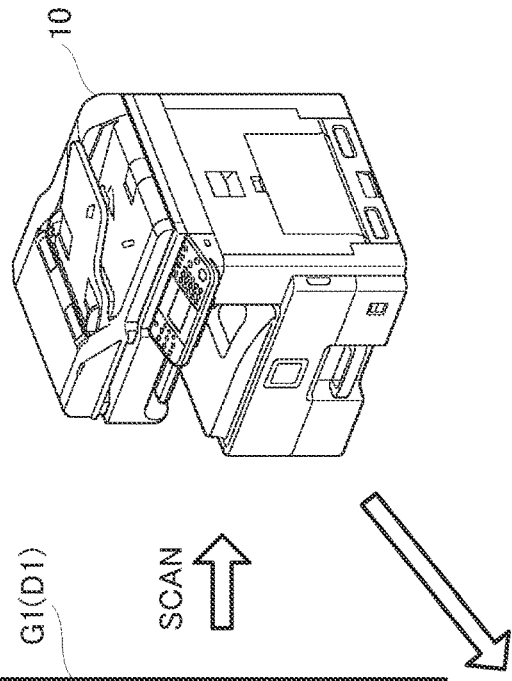
FIG. 3 is a view conceptually showing mis-converted character correction processing.

FIG. 3 is a view conceptually showing mis-converted character correction processing. The image forming apparatus 10 has, as shown in FIG. 3, a configuration for executing mis-converted character correction processing for extracting a text TX from, for example, the document image D1 obtained by reading of the original document G1, and generating a corrected text CT in which mis-converted characters in the text TX are corrected. The details of this configuration will be described later.

The storage device 19 further includes a font storage 19B. The font storage 19B previously stores, for each of a plurality of predetermined types of fonts including, for example, "Arial", "Courier New", and "Times New Roman", a plurality of font characters (character data) representing respective predetermined characters presented in the font (for example, in English, alphabetical characters from "a" to "z", marks, such as "." and "-", and so on).

The storage device 19 further includes a dictionary storage 19C that previously stores dictionary data containing a plurality of predetermined registered words. The dictionary data comprises dictionary data in a single or plurality of predetermined languages, such as dictionary data for English or dictionary data for Japanese. In this embodiment, assume that the dictionary data comprises dictionary data for English. The dictionary data for English contains a plurality of registered English words (for example, hundreds of thousands of registered words), including "You", "they", . . . , "that", . . . , "should", "may", . . . , "kingdom", and "country".

The control device 11 is formed of a processor, a RAM (random access memory), a ROM (read only memory), and so on. The processor is, for example, a CPU (central processing unit), an MPU (micro processing unit) or an ASIC (application specific integrated circuit). When a control program stored in the storage device 19 is executed by the above processor, the control device 11 functions as a controller 21, a character region identifier 22, an image acquirer 23, a text extractor 24, a word identifier 25, a word determiner 26, and a generator 27. Alternatively, each of the controller 21, the character region identifier 22, the image acquirer 23, the text extractor 24, the word identifier 25, the word determiner 26, and the generator 27 of the control device 11 may not be implemented by the operation of the control device 11 in accordance with the above control program but may be constituted by a hardware circuit.

Figure 4:
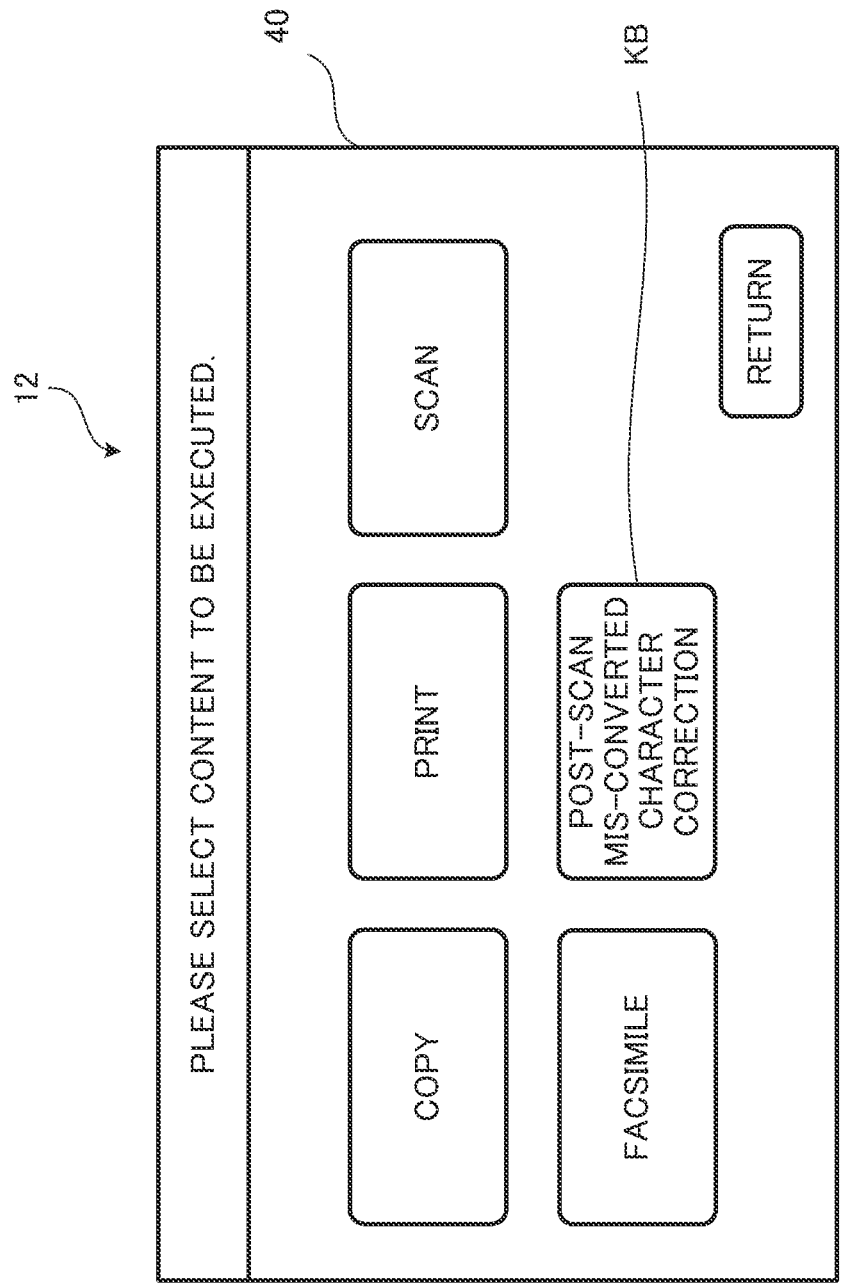
FIG. 4 is a view showing an example of a display screen of a display device.

The controller 21 governs the overall operation control of the image forming apparatus 10. FIG. 4 is a view showing an example of a display screen of the display device 12. For example, the controller 21 allows the display device 12 to display an operation screen 40 shown in FIG. 4. The controller 21 performs, according to a user's touch gesture on the operation screen 40, control on various types of processing, such as copy processing, print processing, scan processing, facsimile processing or mis-converted character correction processing.

The character region identifier 22 identifies a character region CA (see FIG. 6 described hereinafter) in the document image D1 stored in the document image storage 19A (i.e., image data acquired by scanning the original document G1). The character region CA is a region where characters are described. For example, the character region identifier 22 subjects the document image D1 to layout analysis contained in known OCR (optical character recognition) processing to identify the character region CA in the document image D1. The character region identifier 22 allows the storage device 19 to store a layout result showing the character region CA identified in the document image D1.

The image acquirer 23 acquires from the document image D1 an image of the character region CA identified by the character region identifier 22. For example, the image acquirer 23 subjects the document image D1 to known image trimming processing to cut out the image of the character region CA from the document image D1.

The text extractor 24 extracts a text TX from the image of the character region CA. Specifically, the text extractor 24 subjects the image of the character region CA to OCR processing to extract respective pieces of character data on characters in the text in the character region CA and respective pieces of location information on the pieces of character data, each piece of character data in association with its piece of location information.

Figure 6B:
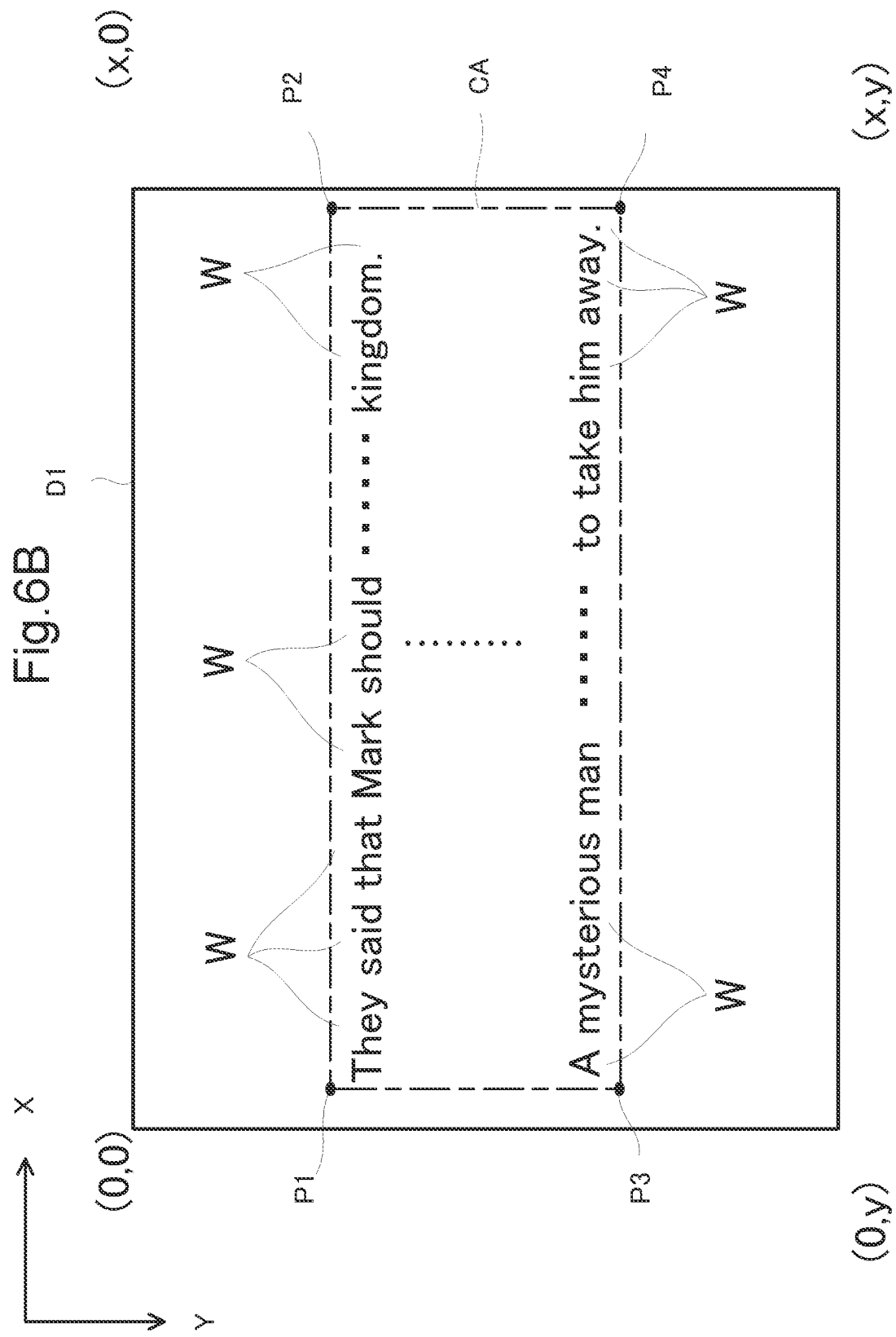
FIG. 6B is a view showing an example of a character region identified in the document image.

The piece of location information on each piece of character data extracted by the text extractor 24 is information indicating the location of the piece of character data in the document image D1. The piece of location information indicates, for example, the coordinates of the associated piece of character data in the document image D1. As shown in FIG. 6A, the text extractor 24 sets the coordinates of the upper left corner of the document image D1 at (0, 0), sets the coordinates of the upper right corner thereof at (x, 0), sets the coordinates of the lower left corner thereof at (0, y), and sets the coordinates of the lower right corner thereof at (x, y). For example, as for the character "T" of "They" in the character region CA shown in FIG. 6B, the text extractor 24 extracts a piece of character data on "T" and a piece of location information indicating the coordinates of the four corners of a rectangular region containing the piece of character data on "T" (or a piece of location information indicating only the coordinates of two corners located along a diagonal line of the rectangular region) in association with each other. Since the character region CA contains a plurality of characters, the text extractor 24 extracts the plurality of pieces of character data and respective pieces of location information on the plurality of pieces of character data, each piece of character data in association with its piece of location information. The text extractor 24 allows the document image storage 19A to store each of the pieces of character data in the character region CA of the document image D1 and the piece of location information on the piece of character data in association with each other.

Figure 7A:
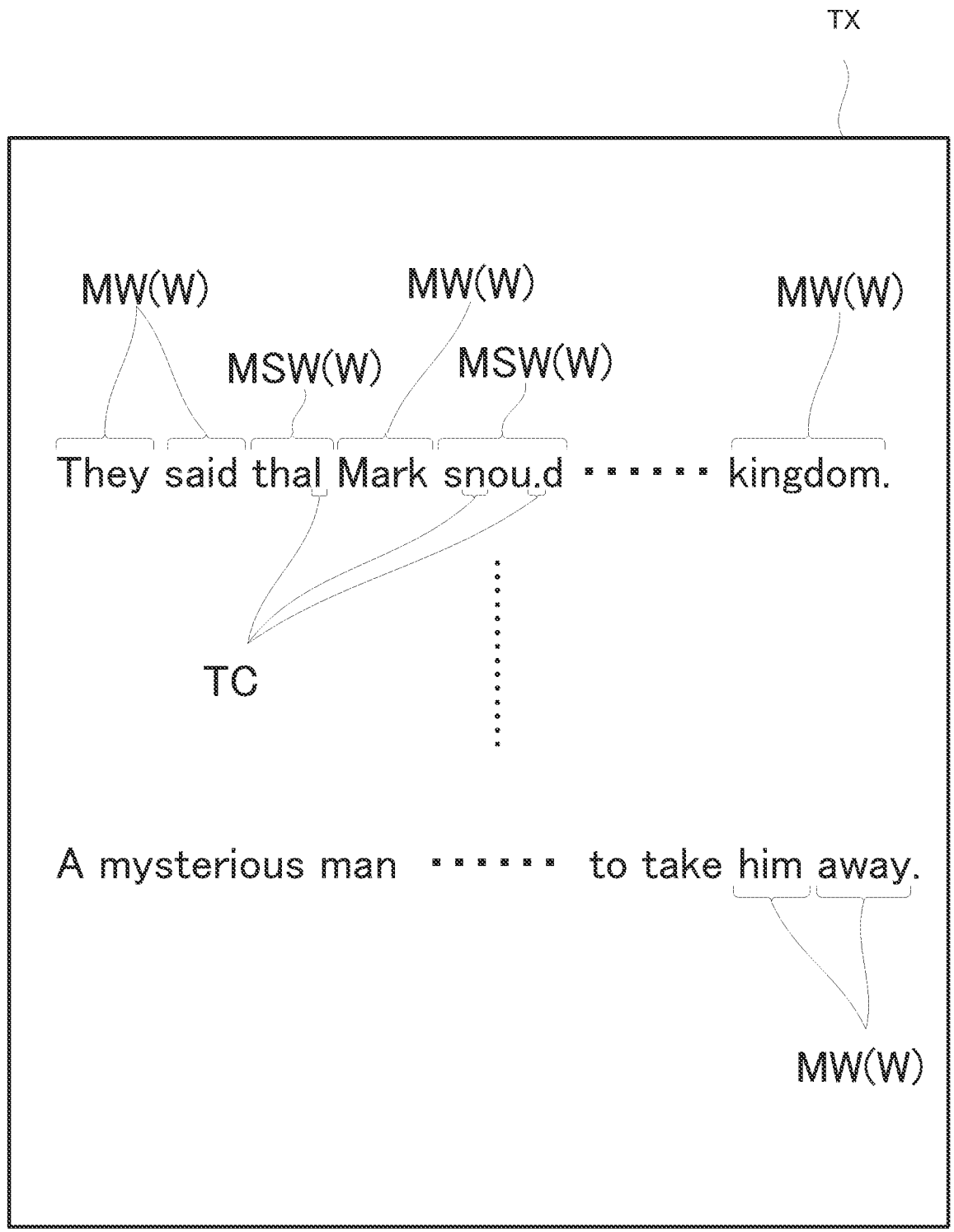
FIG. 7A is a view showing an example of a text extracted from an image of the character region.

The word identifier 25 identifies each of a plurality of words W contained in the text TX. For example, the word identifier 25 identifies a direction of alignment (a horizontal direction in FIG. 7A) of pieces of character data constituting the text TX shown in FIG. 7A and identifies each single piece of character data or each string of pieces of character data separated by character spaces in the direction of alignment of the pieces of character data as a word W. In this case, as shown in FIG. 7A, the word identifier 25 identifies each of a plurality of words W, including "They", "said", "thal", "Mark", "snou.d", . . . , "him", and "away". Alternatively, the word identifier 25 may identify each of the plurality of words W using the pieces of character data constituting the text TX and the respective pieces of location information on the pieces of character data. In the case shown in FIG. 7A, the plurality of words W identified by the word identifier 25 contain words containing mis-converted characters ("thal" and "snou.d" in FIG. 7A). The reason for this is that the paper of the original document G1 has caused degradation, such as wear or scratches, on the surface, so that mis-converted characters are contained in the text acquired by OCR processing.

The word determiner 26 determines, for each of the plurality of identified words W, whether or not the word W is matched with any one of the plurality of registered words contained in the dictionary data stored in the dictionary storage 19C.

For example, for each of the plurality of words W including "They", "said", "thal", "Mark", "snou.d", . . . , "him", and "away" shown in FIG. 7A, the word determiner 26 sequentially determines whether or not the word W is matched with any one of the plurality of registered words.

In this case, the word determiner 26 determines that "They" in the text TX shown in FIG. 7A is matched with "They" being a registered word and determines the word "They" to be a matching word MW. Likewise, the word determiner 26 determines that "said", "Mark", . . . , "him", and "away" are matched with the registered words "said", "Mark", . . . , "him", and "away", respectively, and determines "said", "Mark", . . . , "him", and "away" to be matching words MW.

On the other hand, the word determiner 26 determines that "thal" in the text TX shown in FIG. 7A is not matched with "that", which is one of the plurality of registered words, and not matched with any other registered word, and determines "thal" to be a non-matching word MSW. Furthermore, the word determiner 26 determines that "snou.d" in the text TX shown in FIG. 7A is not matched with "should", which is one of the plurality of registered words, and not matched with any other registered word, and determines "snou.d" to be a non-matching word MSW.

When the text TX contains any non-matching word MSW, the generator 27 replaces each target character TC being a constituent of the non-matching word MSW in the text TX with, among the plurality of font characters stored in the font storage 19B, a replacement character RPC which is a font character having a first degree of matching equal to or higher than a predetermined first rate with the target character TC and a highest first degree of matching with the target character TC, thus generating a corrected text CT (see FIG. 7B) in which all of target characters TC in the non-matching words are replaced with their respective replacement characters RPC.

For example, first, when the text TX contains a matching word MW, the generator 27 identifies a character being a constituent of the matching word MW as a font-determining character FJC. Specifically, when a matching word MW is located just before or just after a non-matching word MSW, the generator 27 identifies a character being a constituent of the matching word MW as a font-determining character FJC. When matching words MW are located just before and just after a non-matching word MSW, the generator 27 identifies a character being a constituent of either the matching word MW located just before the non-matching word MSW or the matching word MW located just after the non-matching word MSW as a font-determining character FJC. When any matching word MW is located neither just before nor just after a non-matching word MSW, the generator 27 identifies a character being a constituent of a matching word MW present in a sentence containing the non-matching word MSW as a font-determining character FJC.

Subsequently, the generator 27 calculates, for each of the plurality of types of fonts described previously, a second degree of matching indicating the degree of matching of the font-determining character FJC with a font character showing the same character as the font-determining character FJC. The generator 27 identifies a font of a font character the second degree of matching calculated as for which is equal to or higher than a predetermined second rate (for example, 90%) and is the highest among the font characters showing the same character. The generator 27 replaces each target character TC with a replacement character RPC which is, among a plurality of font characters presented in the identified font, a font character having a first degree of matching equal to or higher than a first rate with the target character TC and a highest first degree of matching with the target character TC.

Specifically, when the text TX contains a non-matching word MSW, the generator 27 divides a rectangular bounding box BB, which has been created by delimiting a target character image TCI representing a target character TC being a constituent of the non-matching word MSW on a character basis, into pixel regions forming a grid of a predetermined number of columns and a predetermined number of rows, also divides each of a plurality of respective rectangular character boxes CB, which have been prepared for the plurality of font characters for respective characters presented in the identified one of the above-described plurality of types of fonts, into pixel regions forming a grid of a predetermined number of columns and a predetermined number of rows, and calculates, for each of the plurality of character boxes CB, the degree of matching of its pixel regions with the bounding box BB as the first degree of matching.

Subsequently, (i) when the highest one HM of the calculated first degrees of matching is equal to higher than a predetermined first threshold TH1 (for example, 97%), the generator 27 identifies a character box CB having the highest degree of matching HM as a first character box corresponding to a first bounding box showing a complete character, and avoids replacement of the target character TC with a font character shown in the first character box.

(ii) When the highest degree of matching HM is lower than the first threshold TH1 and equal to or higher than a predetermined second threshold TH2 (for example, 90%) lower than the first threshold TH1, the generator 27 identifies a character box CB having the highest degree of matching HM as a second character box corresponding to a second bounding box showing a broken character, and replaces the target character TC with a font character shown in the second character box.

(iii) When the highest degree of matching HM is lower than the second threshold TH2, the generator 27 identifies a character box CB having the highest degree of matching HM as a third character box not serving as a replacement candidate, avoids replacement of the target character TC with a font character shown in the third character box, and changes the presentation manner of the target character TC to a different presentation manner from that of the other target characters TC.

The controller 21 allows the display device 12 to display the corrected text CT. When a user's operation for print instruction is made on the operation device 14, the controller 21 allows the image forming device 18 to form an image representing the corrected text CT on a recording paper sheet. When a user's operation for data output instruction is made on the operation device 14, the controller 21 allows the communication device 16 to output (send) image data representing the corrected text CT to the external device 30.

Figure 5:
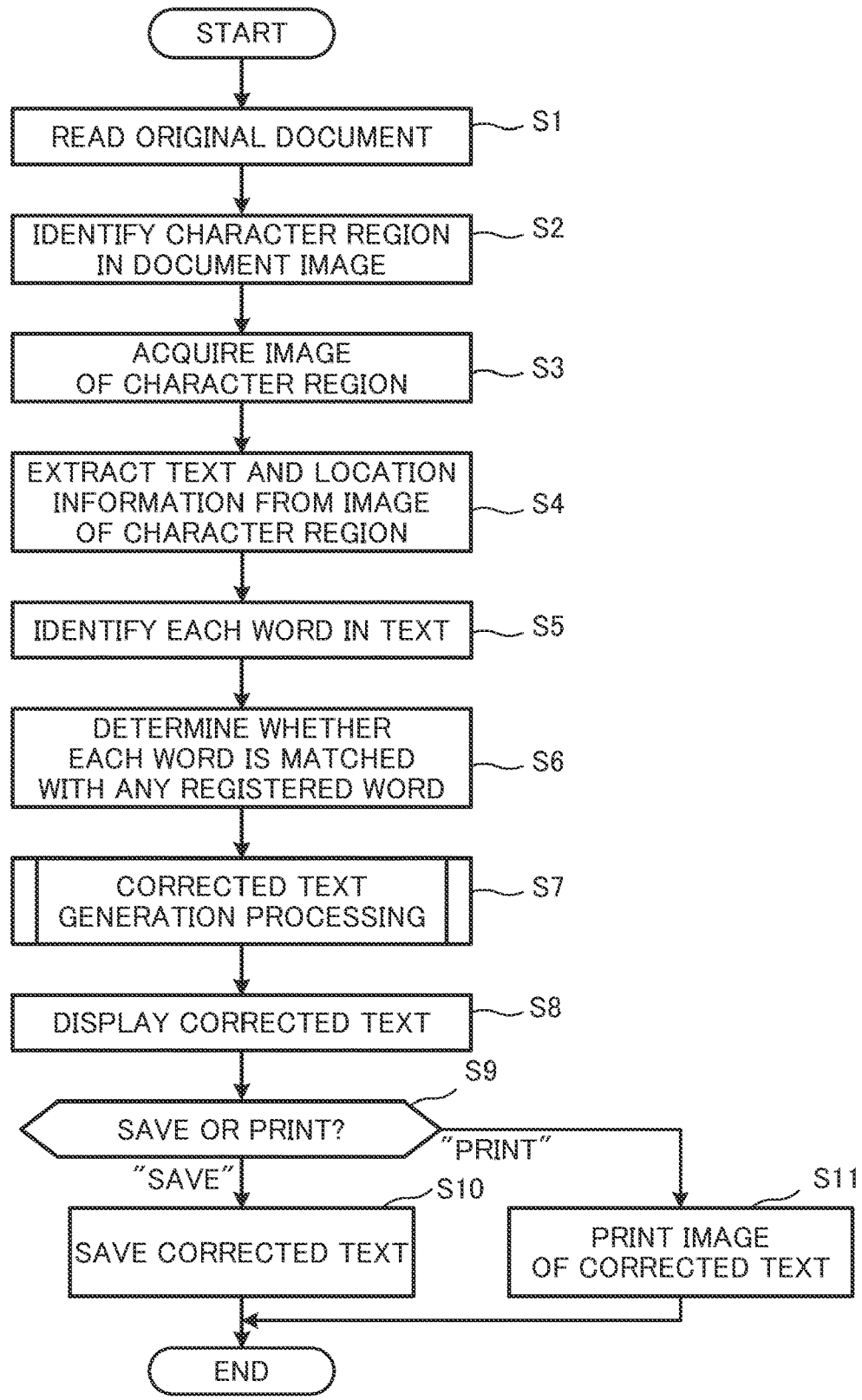
FIG. 5 is a flowchart showing an example of the mis-converted character correction processing.

Next, a description will be given of mis-converted character correction processing executed by the image forming apparatus 10. FIG. 5 is a flowchart showing an example of the mis-converted character correction processing.

When the controller 21 allows the display device 12 to display the display screen 40 and, in this state, the touch panel 15 detects a touch gesture on a key KB showing a character string "Post-Scan Mis-Converted Character Correction", the controller 21 starts execution of mis-converted character correction processing shown in FIG. 5. Specifically, when the user touches the key KB, the touch panel 15 detects the touch gesture on the key KB and outputs a start signal for the mis-converted character correction processing to the controller 21. The controller 21 starts execution of the mis-converted character correction processing in response to the input of the start signal.

When the original document G1 shown in FIG. 3 is placed on the image reading device 17 by the user and, in this state, the operation device 14 detects user's pressing of the start button, the controller 21 allows the image reading device 17 to read the original document G1 (step S1). The controller 21 allows the document image storage 19A to store image data representing the document image D1 generated by the image reading device 17.

FIG. 6A is a view showing an example of a document image D1 subjected to layout analysis. FIG. 6B is a view showing an example of a character region CA identified in the document image D1. The character region identifier 22 subjects the document image D1 shown in FIG. 6A to layout analysis contained in OCR processing, thus identifying a character region CA in the document image D1 as shown in FIG. 6B (step S2). Furthermore, the character region identifier 22 acquires, based on information on coordinates in the document image D1, location information indicating the location of the character region CA in the document image D1. For example, the character region identifier 22 acquires respective pieces of location information indicating the respective coordinates of the upper left corner P1, the upper right corner P2, the lower left corner P3, and the lower right corner P4 of the character region CA.

The image acquirer 23 acquires, from the document image D1 shown in FIG. 6B, an image of the character region CA identified by the character region identifier 22 (step S3).

The text extractor 24 subjects the image of the character region CA to OCR processing to extract respective pieces of character data on characters in a text in the character region CA and respective pieces of location information on the pieces of character data, each piece of character data in association with its piece of location information (step S4). FIG. 7A is a view showing an example of a text TX extracted from the image of the character region CA. Specifically, as far as the first word "They" in the text TX shown in FIG. 7A is concerned, the text extractor 24 extracts respective pieces of character data on "T", "h", "e", and "y" and respective pieces of location information on these pieces of character data, each piece of character data in association with its piece of location information. Likewise, the text extractor 24 extracts respective pieces of character data on the remaining characters following "They" and respective pieces of location information on the pieces of character data, each piece of character data in association with its piece of location information.

The word identifier 25 identifies each of a plurality of words W contained in the extracted text TX (step S5). In this case, as shown in FIG. 7A, the word identifier 25 each of a plurality of words W, including "They", "said", "thal", "Mark", "snou.d", "him", and "away".

The word determiner 26 determines, for each of the plurality of identified words W, whether or not the word W is matched with any one of the plurality of registered words contained in the dictionary data stored in the dictionary storage 19C (step S6).

In this case, the word determiner 26 determines that, among the plurality of words W identified in the text TX shown in FIG. 7A, "They", "said", "Mark", ..., "him", and "away" are matched with the registered words "They", "said", "Mark", ..., "him", and "away", respectively, and determines these words "They", "said", "Mark", ..., "him", and "away" to be matching words MW.

On the other hand, the word determiner 26 determines that "thal" and "snou.d" are not matched with any of the plurality of registered words, and determines "thal" and "snou.d" to be non-matching words MSW.

Figure 9:
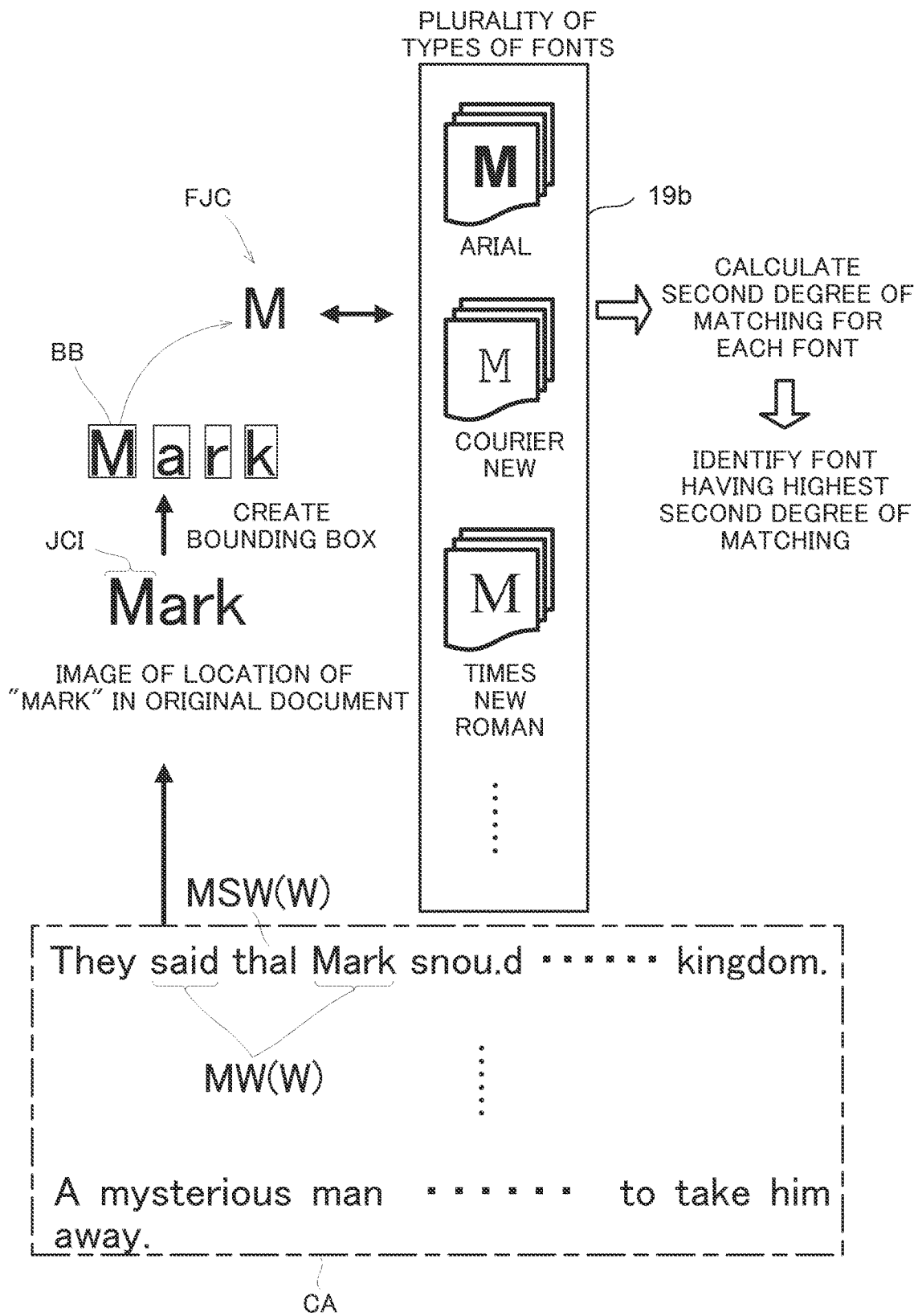
FIG. 9 is a view conceptually showing font identification processing.

The generator 27 executes corrected text generation processing (step S7). FIG. 8 is a flowchart showing an example of corrected text generation processing. FIG. 9 is a view conceptually showing font identification processing for identifying the font of a font-determining character.

As shown in FIG. 8, when the text TX contains a matching word MW, the generator 27 identifies a character being a constituent of the matching word MW as a font-determining character FJC (step S71). In this case, as shown in FIG. 9, "said" and "Mark" being matching words MW are located just before and just after "thal" being a non-matching word MSW. The generator 27 identifies as a font-determining character JFC a character "M" present in a predetermined place (the first place in this case) in constituent characters of "Mark" which is the latter matching word MW. The predetermined place may be any place other than the first place and, for example, may be the last place (for example, "k" in "Mark").

As shown in FIG. 9, the generator 27 calculates, for each of the plurality of types of fonts ("Arial", "Courier New", and "Times New Roman" in this case) described previously, a second degree of matching indicating the degree of matching of the font-determining character FJC ("M" in this case) with a font character showing the same character as the font-determining character FJC, and identifies a font of a font character the second degree of matching calculated as for which is equal to or higher than a predetermined second rate (90% in this case) and is the highest among the font characters showing the same character (step S72).

FIG. 10 is a view showing an example of the font identification processing. Specifically, as shown in FIG. 10, the generator 27 divides a rectangular bounding box BB, which has been created by delimiting a determining character image JCI (an image of "M" in this case) representing the font-determining character FJC on a character basis, into pixel regions forming a grid of a predetermined number of columns and a predetermined number of rows (for example, 22×22), also divides each of a plurality of rectangular character boxes CB, which have been prepared for respective font characters showing "M" presented in the above-described plurality of types of fonts, into pixel regions forming a grid of a predetermined number of columns and a predetermined number of rows (for example, 22×22). Furthermore, the generator 27 calculates, for each of the plurality of character boxes CB, the degree of matching of the pixel regions with the bounding box BB as the second degree of matching.

In this case, the generator 27 has calculated 94.38% as the second degree of matching of the bounding box BB showing "M" with the character box CB showing "M" presented in "Arial" font. Furthermore, the generator 27 has calculated 80.79% as the second degree of matching of the bounding box BB showing "M" with the character box CB showing "M" presented in "Courier New" font. Moreover, the generator 27 has calculated a lower value than 94.38% as the second degree of matching of the bounding box BB showing "M" with the character box CB showing "M" presented in "Times New Roman" font. In this case, the second degree of matching of the character box CB showing "M" presented in "Arial" font exhibits a value higher than the predetermined rate and the highest value. Therefore, the generator 27 identifies "Arial" as the font of the font-determining character FJC.

Figure 11:
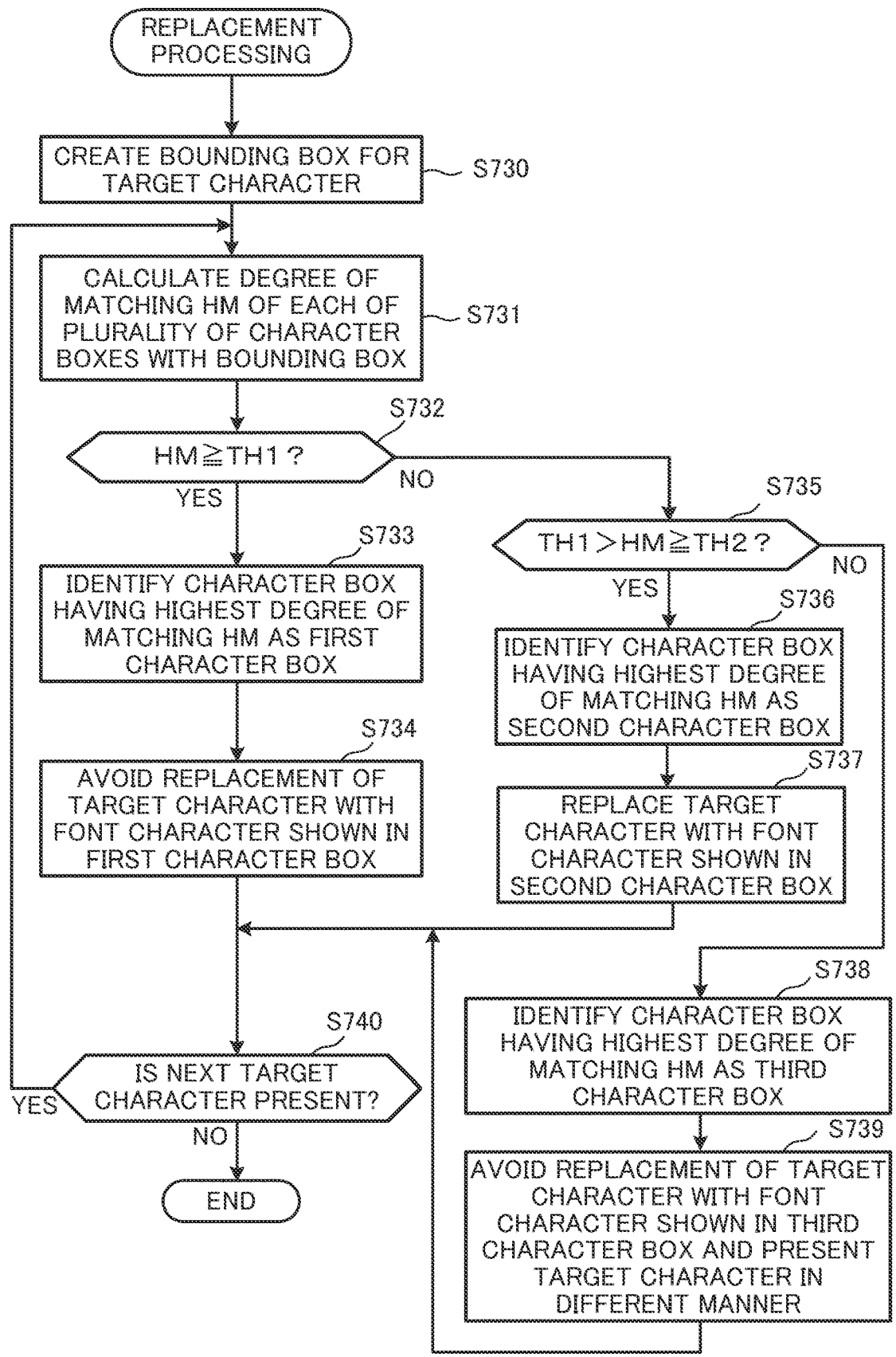
FIG. 11 is a flowchart showing an example of replacement processing.
Figure 12:
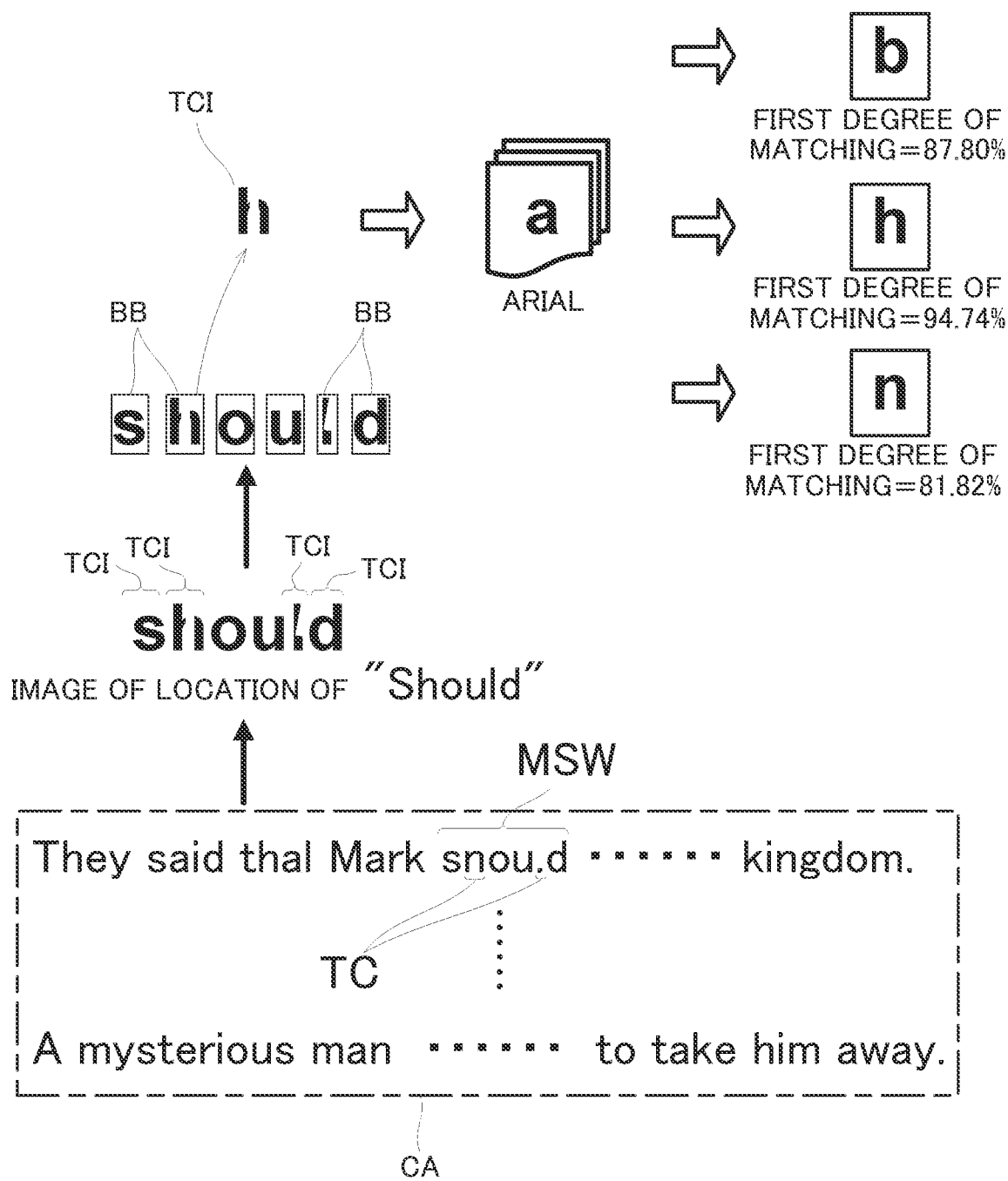
FIG. 12 is a view conceptually showing character identification processing.

Referring back to FIG. 8, the generator 27 executes replacement processing for replacing a non-matching word MSW in the text TX with a correct word (step S73). FIG. 11 is a flowchart showing an example of replacement processing. FIG. 12 is a view conceptually showing character identification processing for identifying the most similar character to the target character TC.

When the text TX contains a plurality of non-matching words MSW, the generator 27 executes the replacement processing in accordance with the order of appearance of the plurality of non-matching words MSW. In this case, the generator 27 first replaces "thal" with a correct word and then replaces "snou.d" with a correct word. Herein, for explanatory convenience, a description will be given of only "snou.d" which is a non-matching word MSW as an example.

The generator 27 creates, for each of respective target character images TCI representing a plurality of target characters TC constituting "snou.d" being a non-matching word MSW, a rectangular bounding box BB in which the target character image TCI is delimited on a character basis (step S730). Specifically, as shown in FIG. 12, the generator 27 creates respective bounding boxes BB for respective target character images TCI corresponding to "s", "n", "o", "u", ".", and "d" which are the plurality of target characters TC constituting "snou.d". In other words, the generator 27 creates a bounding box BB of "s", a bounding box BB of "n", a bounding box BB of "o", a bounding box BB of "u", a bounding box BB of ".", and a bounding box BB of "d".

The generator 27 divides each of the bounding box BB of "s" and a plurality of rectangular character boxes CB, which have been prepared for the plurality of font characters for respective characters presented in the font ("Arial" font in this case) identified by the font identification processing, into pixel regions forming a grid of a predetermined number of columns and a predetermined number of rows (for example, 22×22), and calculates, for each of the plurality of character boxes CB, the degree of matching of its pixel regions with the bounding box BB as the first degree of matching (step S731).

In this case, the generator 27 has calculated 99% as the first degree of matching for the character box CB of "s" from among respective character boxes CB of a plurality of font characters (including alphabetical characters from "a" to "z", marks including "." and "-", and other characters) presented in "Arial" font, and has calculated values lower than 90% as the first degrees of matching for the character boxes CB of the remaining characters other than "s".

The generator 27 determines whether or not the highest degree of matching HM of the calculated first degrees of matching is equal to or higher than the first threshold TH1 (97% in this case) (step S732). In this case, the generator 27 determines that the highest degree of matching HM (99% mentioned above) is higher than the first threshold TH1 (YES in step S732), identifies a character box CB having the highest degree of matching HM as a first character box corresponding to a first bounding box showing a complete character (step S733), and avoids replacement of the target character TC with a font character shown in the first character box (step S734). In other words, the generator 27 determines "s" being a constituent of the non-matching word MSW "snou.d" not to be a mis-converted character and does not replace "s" with any character.

Subsequently, after step S734, the generator 27 determines whether or not a next target character TC is present (step S740). In this case, because "n" is present as a target character TC following "s" in the non-matching word MSW "snou.d", the generator 27 determines that a next target character TC is present (YES in step S740), and proceeds to the processing in step S731.

Figure 13:
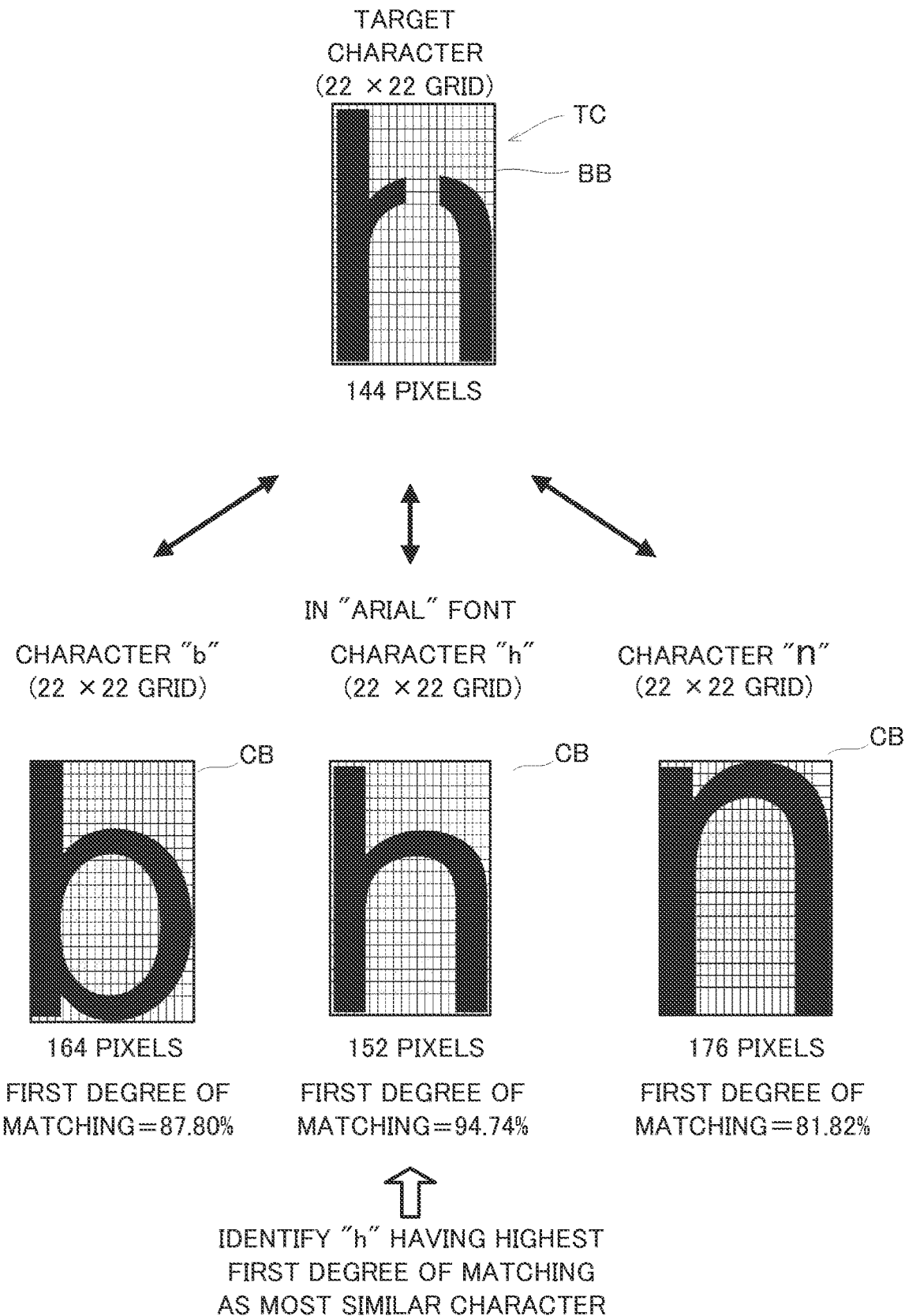
FIG. 13 is a view showing an example of the character identification processing.

FIG. 13 is a view showing an example of the character identification processing. As shown in FIG. 13, the generator 27 divides each of the bounding box BB of "n" and a plurality of rectangular character boxes CB, which have been prepared for the plurality of font characters for respective characters presented in the font ("Arial" font in this case) identified by the font identification processing, into pixel regions forming a grid of a predetermined number of columns and a predetermined number of rows (for example, 22×22), and calculates, for each of the plurality of character boxes CB, the degree of matching of its pixel regions with the bounding box BB as the first degree of matching (step S731).

The target character image TCI represented in the bounding box BB of "n" shows a character having a partially missing or broken shape (a broken character). If a document image containing such a broken character is subjected to OCR processing, the broken character is highly likely to be mis-converted.

In this case, the generator 27 has calculated 87.80% as the first degree of matching for the character box CB of "b" from among respective character boxes CB of a plurality of font characters (including alphabetical characters from "a" to "z", marks including "." and "-", and other characters) presented in "Arial" font, has calculated 94.74% as the first degree of matching for the character box CB of "h", and has calculated 81.82% as the first degree of matching for the character box CB of "n".

The generator 27 determines whether or not the highest degree of matching HM of the calculated first degrees of matching is equal to or higher than the first threshold TH1 (97% in this case) (step S732). In this case, the generator 27 determines that the highest degree of matching HM (94.74% mentioned above) is neither equal to nor higher than the first threshold TH1 (NO in step S732).

Subsequently, the generator 27 determines whether or not the highest degree of matching HM is lower than the first threshold TH1 and equal to or higher than the second threshold TH2 (90% in this case) (step S735). In this case, the generator 27 determines that the highest degree of matching HM (94.74% mentioned above) is lower than the first threshold TH1 and higher than the second threshold TH2 (YES in step S735), identifies a character box CB having the highest degree of matching HM as a second character box corresponding to a second bounding box showing a broken character (step S736), and replaces the target character TC with a font character shown in the second character box (step S737). In other words, the generator 27 determines "n" being a constituent of the non-matching word MSW "snou.d" to be a mis-converted character and replaces "n" with a character "h" which is a replacement character RPC.

Subsequently, after step S737, the generator 27 determines whether or not a next target character TC is present (step S740). In this case, because "o" is present as a target character TC following "n" in the non-matching word MSW "snou.d", the generator 27 determines that a next target character TC is present (YES in step S740), and proceeds to the processing in step S731.

In the same manner as above, the generator 27 executes the replacement processing (step S73) on each of the remaining bounding boxes BB for the non-matching word MSW "snou.d", i.e., the bounding box BB of "o", the bounding box BB of "u", the bounding box BB of ".", and the bounding box BB of "d".

The characters "o", "u", and "d" being constituents of the non-matching word MSW "snou.d" are not mis-converted characters. Therefore, as for the characters "o", "u", and "d", the generator 27 determines the highest degree of matching HM to be equal to or higher than the first threshold TH1 (YES in step S732), and does not replace these characters with respective font characters shown in their first character boxes.

On the other hand, the character "." being a constituent of the non-matching word MSW "snou.d" is a mis-converted character. Therefore, as for the character ".", the generator 27 determines the highest degree of matching HM to be lower than the first threshold TH1 and equal to or higher than the second threshold TH2 (YES in step S735), identifies a character box CB having the highest degree of matching HM (a character box CB showing "l" (lowercase letter el) in this case) as a second character box (step S736), and replaces the target character TC with a font character ("l" in this case) shown in the second character box (step S737). In other words, the generator 27 determines "." being a constituent of the non-matching word MSW "snou.d" to be a mis-converted character and replaces "." with a character "l" (lowercase letter el) which is a replacement character RPC.

Although, in the above case, as for the character "." being a constituent of the non-matching word MSW "snou.d", the generator 27 determines the highest degree of matching HM to be lower than the first threshold TH1 and equal to or higher than the second threshold TH2 (YES in step S735), the present disclosure is not limited to such an embodiment. Hereinafter, a description will be given of the case where the generator 27 determines that the highest degree of matching HM is lower than the second threshold TH2.

Figure 15:
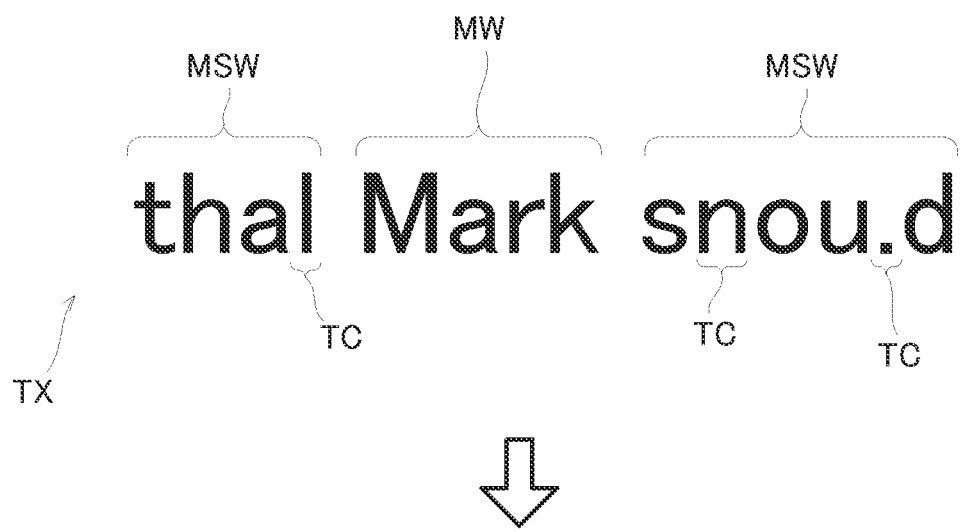
FIG. 15 is a view showing an example of a presentation manner of an uncorrected mis-converted character.

When, as for the character "." being a constituent of the non-matching word MSW "snou.d", the generator 27 determines that the highest degree of matching HM is lower than the second threshold TH2 (NO in step S735), the generator 27 identifies a character box CB having the highest degree of matching HM as a third character box not serving as a replacement candidate (step S738), avoids replacement of the target character TC with a font character shown in the third character box, changes, as shown in FIG. 15, the presentation manner of the target character TC to a different presentation manner from that of the other target characters TC (step S739), and proceeds to the processing in step S740.

FIG. 15 shows an example of a presentation manner of an uncorrected mis-converted character. As for the character "." being a constituent of the non-matching word MSW "snou.d", the generator 27 changes the background of the character "." to a color (substituted for by hatching in FIG. 15) different from the background of the other target characters TC.

Subsequently, the generator 27 determines whether or not a next target character TC is present (step S740). In this case, because no target character TC following "d" in the non-matching word MSW "snou.d" is present, the generator 27 determines that no next target character TC is present (NO in step S740), and proceeds to the processing in step S74 shown in FIG. 8.

The generator 27 determines whether or not a next non-matching word MSW is present (step S74). When a next non-matching word MSW is present (YES in step S74), the generator 27 determines whether or not the next non-matching word MSW is present in the same sentence as the previous non-matching word MSW (step S75). For example, when another non-matching word MSW is present posterior to the non-matching word MSW "snou.d" in the text shown in FIG. 7A, the generator 27 determines whether or not the other non-matching word MSW is present in the sentence "They . . . kingdom.". When determining that the other non-matching word MSW is present in the sentence "They . . . kingdom." (YES in step S75), the generator 27 proceeds to the processing in step S73. On the other hand, when determining that the other non-matching word MSW is not present in the sentence "They . . . kingdom." (NO in step S75), the generator 27 proceeds to the processing in step S71.

When determining that no next non-matching word MSW is present (NO in step S74), the generator 27 ends the corrected text generation processing shown in FIG. 8.

FIG. 14 is a view showing an example of a method for generating a corrected text CT. As shown in FIG. 14, the generator 27 replaces the non-matching words MSW "thal" and "snou.d" in the text TX with their correct words "that" and "should", respectively. Specifically, the generator 27 replaces the non-matching word MSW "thal" with its correct word "that" by replacing a target character TC "l" being a constituent of the non-matching word MSW "thal" with a replacement character RPC "t". Furthermore, the generator 27 replaces the non-matching word MSW "snou.d" with its correct word "should" by replacing target characters TC "n" and "." being constituents of the non-matching word MSW "snou.d" with replacement characters RPC "h" and "l", respectively.

Figure 7B:
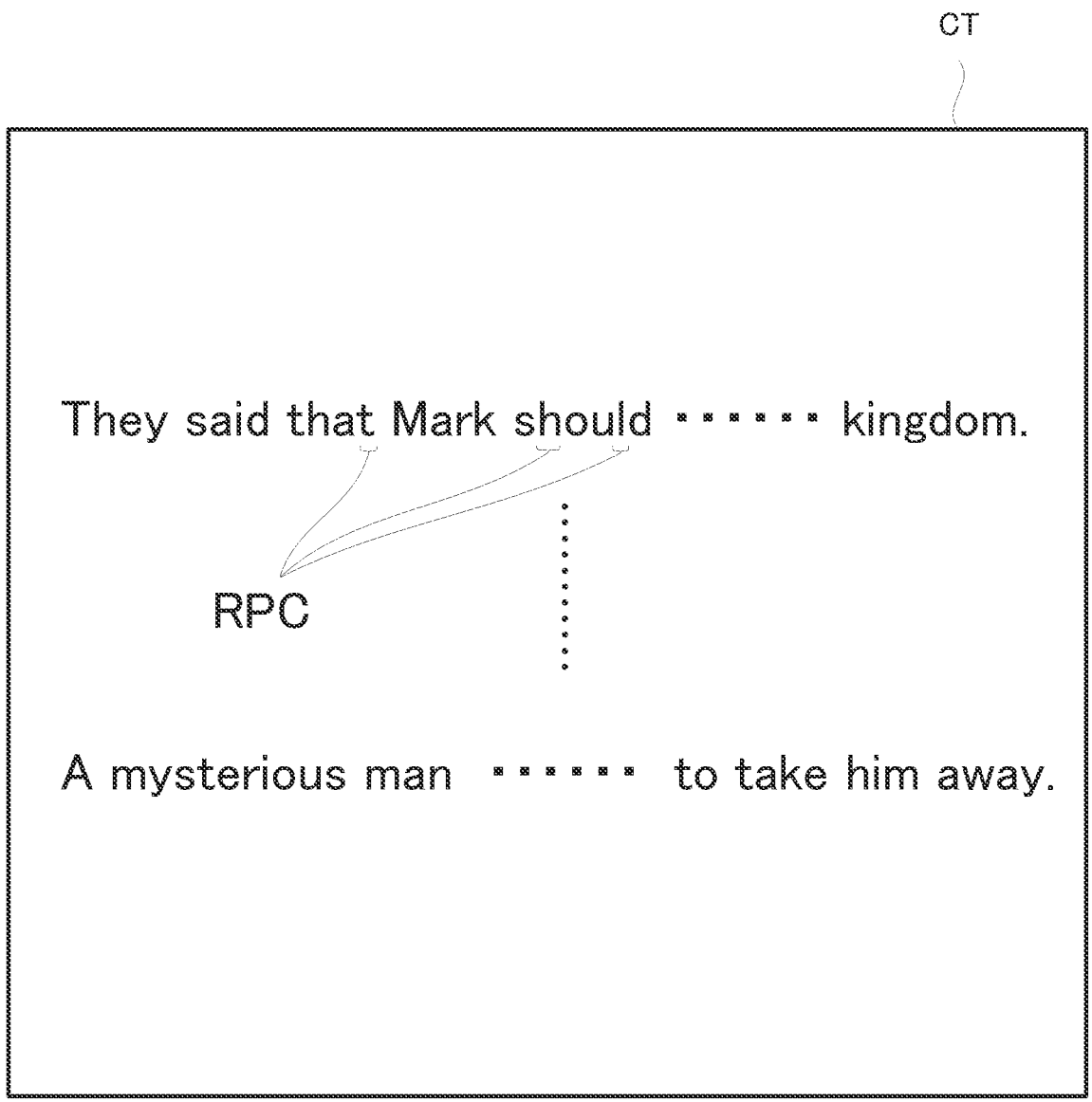
FIG. 7B is a view showing an example of a corrected text.

Referring back to FIG. 5, the controller 21 allows the display device 12 to display the corrected text CT shown in FIG. 7B (step S8). FIG. 7B is a view showing an example of a corrected text CT.

The controller 21 determines whether or not an instruction for saving or printing from the user has been accepted (step S9). When the touch panel 15 detects pressing of a "SAVE" button ("SAVE" in step S9), the controller 21 allows the storage device 19 to store the corrected text CT (step S10) and ends the mis-converted character correction processing. On the other hand, when the touch panel 15 detects pressing of a "PRINT" button ("PRINT" in step S9), the controller 21 allows the image forming device 18 to form an image of the corrected text CT on a recording paper sheet (step S11) and ends the mis-converted character correction processing.

Alternatively, determination of whether or not an instruction for sending has been accepted may be added to the processing in step S9. In this case, when a user's operation for data output instruction, for example, pressing of a "SEND" button, is made on the operation device 14, the controller 21 allows the communication device 16 to output (send) the corrected text CT to the external device 30 and ends the mis-converted character correction processing.

Even if there is nothing wrong with the placement of an original document on the original glass plate, a text acquired by OCR processing may contain a mis-converted character. In this case, the general image forming apparatus described previously cannot determine which character in the text is mis-converted, and therefore cannot correct the mis-converted character to an appropriate character. Furthermore, if an original document containing a partially missing or broken character image (hereinafter, referred to conveniently as a "broken character image") is subjected to OCR processing, at least the broken character image is highly likely to be mis-converted.

To cope with this problem, in the above embodiment, the document image storage 19A previously stores an original document D1. The dictionary storage 19C previously stores dictionary data containing a plurality of registered words. The font storage 19B previously stores a plurality of font characters for each of a plurality of types of fonts. The character region identifier 22 identifies a character region CA in the document image D1. The image acquirer 23 acquires an image of the character region CA from the document image D1. The text extractor 24 extracts a text TX from the image of the character region CA. The word identifier 25 identifies each of a plurality of words W contained in the text TX. The word determiner 26 determines whether or not each of the plurality of words W is matched with any one of the plurality of registered words. When the text TX contains a non-matching word MSW having been determined not to be matched with any of the registered words by the word determiner 26, the generator 27 generates a corrected text CT by replacing a target character TC being a constituent of the non-matching word MSW in the text TX with a replacement character RPC which is, among the plurality of font characters, a font character having a first degree of matching equal to or higher than the first rate with the target character TC and a highest first degree of matching with the target character TC.

As seen from the above, non-matching words MSW are extracted, so that mis-converted characters contained in the non-matching words MSW can be detected. In other words, mis-converted characters in the text TX can be detected. In addition, since a corrected text CT where target characters TC in the text TX are replaced with replacement characters RPC is generated, the mis-converted characters in the text TX can be corrected. Hence, mis-converted characters in the text TX acquired by OCR processing can be detected and corrected.

Furthermore, in the above embodiment, when the text TX contains a matching word MW having been determined to be matched with one of the registered words by the word determiner 26, the generator 27 identifies a character being a constituent of the matching word MW as a font-determining character FJC, calculates, for each of the plurality of types of fonts, a second degree of matching indicating the degree of matching of the font-determining character FJC with a font character showing the same character as the font-determining character FJC, and identifies a font of a font character the second degree of matching calculated as for which is equal to or higher than a predetermined second rate and is the highest among the font characters showing the same character. The generator 27 replaces each target character TC with, among a plurality of font characters presented in the identified font, a font character having a first degree of matching equal to or higher than a first rate with the target character TC and a highest first degree of matching with the target character TC.

As just described, the font type is identified, without using any "broken character image" in which the character shape is partially missing or broken, using an image of a complete character correctly recognized in OCR processing (an image of the font-determining character FJC), which increases the accuracy of identifying the font type. Furthermore, mis-converted characters in the text TX acquired by OCR processing can be more accurately corrected.

Moreover, in the above embodiment, the generator 27 divides a rectangular bounding box BB, which has been created by delimiting a target character image TCI representing a target character TC on a character basis, into pixel regions forming a grid of a predetermined number of columns and a predetermined number of rows, also divides each of a plurality of rectangular character boxes CB, which have been prepared for a plurality of font characters for respective characters presented in the identified one of the above-described plurality of types of fonts, into pixel regions forming a grid of a predetermined number of columns and a predetermined number of rows, and calculates, for each of the plurality of character boxes CB, the degree of matching of its pixel regions with the bounding box BB as the first degree of matching. (i) When the highest one HM of the calculated first degrees of matching is equal to or higher than the first threshold TH1, the generator 27 identifies a character box CB having the highest degree of matching HM as a first character box, and avoids replacement of the target character TC with a font character shown in the first character box. (ii) When the highest degree of matching HM is lower than the first threshold TH1 and equal to or higher than the second threshold TH2, the generator 27 identifies a character box CB having the highest degree of matching HM as a second character box, and replaces the target character TC with a font character shown in the second character box.

As just described, (i) when the highest degree of matching HM is equal to or higher than a predetermined first threshold, the generator 27 determines the target character TC to be a correctly recognized complete character and avoids replacement of the target character TC with a font character shown in the first character box. Thus, correctly recognized characters in the text TX acquired by OCR processing can be prevented from being modified in vain. On the other hand, (ii) when the highest degree of matching HM is lower than the first threshold TH1 and equal to or higher than the second threshold TH2, the generator 27 determines the target character TC to be a broken character, i.e., a mis-converted character, and replaces the target character TC with a font character shown in the second character box. Thus, mis-converted characters in the text TX acquired by OCR processing can be accurately detected and the mis-converted characters can be accurately corrected.

Furthermore, in the above embodiment, (iii) when the highest degree of matching HM is lower than the second threshold TH2, the generator 27 identifies a character box CB having the highest degree of matching HM as a third character box, avoids replacement of the target character TC with a font character shown in the third character box, and changes the presentation manner of the target character TC to a different presentation manner from that of the other target characters TC.

Thus, it can be shown that the target character TC is a mis-converted character and is not accurately corrected, which enables the user to be reminded of the fact.

In the above embodiment, when a matching word MW is located just before or just after a non-matching word MSW, the generator 27 identifies a character being a constituent of the matching word MW as a font-determining character FJC. When matching words MW are located just before and just after a non-matching word MSW, the generator 27 identifies a character being a constituent of either the matching word MW located just before the non-matching word MSW or the matching word MW located just after the non-matching word MSW as a font-determining character FJC. When any matching word MW is located neither just before nor just after a non-matching word MSW, the generator 27 identifies a character being a constituent of a matching word MW present in a sentence containing the non-matching word MSW as a font-determining character FJC.

A non-matching word MSW is highly likely to be of the same font as a matching word MW present in a sentence containing the non-matching word MSW. Furthermore, a non-matching word MSW is more likely to be of the same font as a matching word MW located just before or just after the non-matching word MSW. Therefore, when an image of a character being a constituent of a matching word MW located just before or just after a non-matching word MSW, which is an image of a complete character correctly recognized in OCR processing, is used as a font-determining character FJC, the accuracy of identifying the font type can be further increased.

Figure 16:
FIG. 16 is a view showing another example of a method for generating a corrected text.

Next, a description will be given of an image forming apparatus 10 according to a modification of the above embodiment with reference to FIG. 16. FIG. 16 is a view showing another example of a method for generating a corrected text.

In the above embodiment, (i) when the highest degree of matching HM is equal to or higher than the first threshold TH1, the generator 27 avoids replacement of the target character TC with a font character shown in the first character box. Furthermore, (iii) when the highest degree of matching HM is lower than the second threshold TH2, the generator 27 avoids replacement of the target character TC with a font character shown in the third character box. However, the present disclosure is not limited to this implementation. In this modification, (i) when the highest degree of matching HM is equal to or higher than the first threshold TH1, the generator 27 replaces the target character TC with a font character shown in the first character box. Furthermore, (iii) when the highest degree of matching HM is lower than the second threshold TH2, the generator 27 replaces the target character TC with a font character shown in the third character box, without changing the presentation manner of the target character TC.

Specifically, the generator 27 divides a rectangular bounding box BB, which has been created by delimiting a target character image TCI representing the target character TC on a character basis, into pixel regions forming a grid of a predetermined number of columns and a predetermined number of rows, also divides each of a plurality of rectangular character boxes CB, which have been prepared for a plurality of font characters for respective characters presented in the identified one of the above-described plurality of types of fonts, into pixel regions forming a grid of a predetermined number of columns and a predetermined number of rows, and calculates, for each of the plurality of character boxes CB, the degree of matching of its pixel regions with the bounding box BB as the first degree of matching. The generator 27 identifies, among the plurality of character boxes CB, a character box having a highest first degree of matching and replaces the target character TC with a font character (i.e., a replacement character RPC) shown in the identified character box having the highest first degree of matching.

As shown in FIG. 16, the generator 27 replaces the non-matching words MSW "thal" and "snou.d" in the text TX with their correct words "that" and "should", respectively. Specifically, the generator 27 replaces the non-matching word MSW "thal" with its correct word "that" by replacing all of target characters TC ("t", "h", "a", and "l") constituting the non-matching word MSW "thal" with their respective replacement characters RPC ("t", "h", "a", and "t"). Furthermore, the generator 27 replaces the non-matching word MSW "snou.d" with its correct word "should" by replacing all of target characters TC ("s", "n", "o", "u", ".", and "d") constituting the non-matching word MSW "snou.d" with their respective replacement characters RPC ("s", "h", "o", "u", "l", and "d").

In the above modification, mis-converted characters in the text TX acquired by OCR processing can be accurately corrected.

The present disclosure is not limited to the configuration of the above embodiment and modification and can be modified in various ways.

Although in the above embodiment and modification, the character region identifier 22 identifies a character region CA by subjecting an original document D1 to layout analysis, the present disclosure is not limited to this implementation. For example, the character region identifier 22 may identify a character region CA in a document image D1 according to a user's specification of the character region CA. For example, when the touch panel 15 detects a user's two-point touch gesture on an upper left corner and a lower right corner of a rectangular range of the document image D1 being displayed on the display device 12, the character region identifier 22 identifies as a character region CA the rectangular range detected by the touch panel 15. The above user's gesture may be a four-point gesture specifying the four corners of the rectangular range, a gesture of enclosing an image (a drag gesture) or other gestures.

Although in the above embodiment and modification the image processing device 2 mounted in the image forming apparatus 10 has been described as an example of the image processing device, the present disclosure is not limited to such an image processing device. For example, the image processing device may be an image processing device (for example, a personal computer, a server or a mobile information terminal) including a control device 11 and a storage device 19 each shown in FIG. 2.

The structure, configuration, and processing of the above embodiment described with reference to FIGS. 1 to 16 are merely illustrative of the present disclosure and the present disclosure is not intended to be limited to the above structure, configuration and processing.

While the present disclosure has been described in detail with reference to the embodiments thereof, it would be apparent to those skilled in the art the various changes and modifications may be made therein within the scope defined by the appended claims.

What is claimed is:

1. An image processing device comprising:
a storage device that previously stores a document image of an original document, a plurality of predetermined registered words, and a plurality of font characters representing respective predetermined characters presented in a predetermined font; and
a control device that includes a processor and functions, through the processor executing a control program, as
a character region identifier that identifies a character region in the document image,
an image acquirer that acquires an image of the character region from the document image,
a text extractor that extracts a text from the image of the character region,
a word identifier that identifies each of a plurality of words contained in the text,
a word determiner that determines whether or not each of the plurality of words is matched with any one of the plurality of registered words, and
a generator that generates, when the text contains a non-matching word having been determined not to be matched with any of the registered words by the word determiner, a corrected text by replacing a target character being a constituent of the non-matching word with, among the plurality of font characters, a font character having a first degree of matching equal to or higher than a predetermined first rate with the target character and having a highest first degree of matching with the target character, wherein
the storage device further previously stores the plurality of font characters for each of a plurality of types of predetermined fonts, and
when the text contains a matching word having been determined to be matched with one of the registered words by the word determiner, the generator identifies a character being a constituent of the matching word as a font-determining character, calculates, for each of the plurality of types of fonts, a second degree of matching indicating a degree of matching of the font-determining character with the font character showing the same character as the font-determining character, identifies a font of the font character the second degree of matching calculated as for which is equal to or higher than a predetermined second rate and is a highest rate among the font characters showing the same character, and replaces the target character with, among the plurality of font characters presented in the identified font, a font character the first degree of matching of which is equal to or higher than the first rate and is a highest rate,
wherein the generator divides a rectangular bounding box, which has been created by delimiting a target character image representing the target character on a character basis, into pixel regions forming a grid of a predetermined number of columns and a predetermined number of rows, also divides each of a plurality of rectangular character boxes, which have been prepared for the plurality of font characters for respective characters presented in the identified font, into pixel regions forming a grid of a predetermined number of columns and a predetermined number of rows, calculates, for each of the plurality of character boxes, a degree of matching of the pixel regions with the bounding box as the first degree of matching,
(i) when a highest one of the calculated first degrees of matching is equal to or higher than a predetermined first threshold, the generator keeps the target character without replacing,
(ii) when the highest one of the calculated first degrees of matching is lower than the first threshold and equal to or higher than a predetermined second threshold lower than the first threshold, the generator replaces the target character with a font character shown in the character box having the highest first degree of matching, and
(iii) when the highest one of the calculated first degrees of matching is lower than the second threshold, the generator changes a presentation manner of the target character to a presentation manner different from that of other target characters without replacing the target character.

2. The image processing device according to claim 1, wherein
when the matching word is located just before or just after the non-matching word, the generator identifies a character being a constituent of the matching word as the font-determining character,
when the matching words are located just before and just after the non-matching word, the generator identifies a character being a constituent of either the matching word located just before the non-matching word or the matching word located just after the non-matching word as the font-determining character, and when the matching word is located neither just before nor just after the non-matching word, the generator identifies a character being a constituent of the matching word present in a sentence containing the non-matching word as the font-determining character.

3. The image processing device according to claim 1, wherein the generator identifies the font-determining character and the font on a sentence-by-sentence basis.

4. An image forming apparatus comprising:
   the image processing device according to claim 1;
   an image reading device that reads an original document to generate the document image; and
   an image forming device that forms an image representing the corrected text on a recording medium,
   wherein the control device further functions as a controller that allows the storage device to store the document image generated by the image reading device.

* * * * *